Patented Mar. 25, 1924.

1,488,097

UNITED STATES PATENT OFFICE.

HENRY N. CREGER, OF SAN FRANCISCO, CALIFORNIA.

DENTIFRICE.

No Drawing.    Application filed March 9, 1922.  Serial No. 542,471.

*To all whom it may concern:*

Be it known that I, HENRY N. CREGER, a citizen of the United States, residing at San Francisco, in the county of San Francisco and State of California, have invented a new and useful Improvement in Dentifrices, of which the following is a specification.

This invention relates to improvements in dental products, tooth paste, mouth washes and the like and has for its object, the production of such a composition which will be particularly efficient as an astringent styptic.

One of the important objects of this invention is the incorporation into a tooth paste, mouth wash or the like of a quantity of the exudation from the bark of the *Eucalyptus rostrata*, commonly known as red gum. Another object of this invention is the manufacture of a dental product or tooth paste which will be particularly agreeable to use and which, on account of its red gum content, will act promptly in preventing bleeding of the gums and which will be absolutely non-toxic.

Still another important object of this invention is the incorporation of fluid extracts of the gummy exudation of the *Eucalyptus rostrata* into products allied to those used in the oral cavity such as hemorrhoidal salves, subcutaneous injections, lozenges, tampons, and the like in all of which products a germicidal action is desired, together with an astringent and soothing effect.

The *Eucalyptus rostrata* is a native of Australia and also is cultivated in parts of the Mediterranean district. The gummy exudation from its bark has several peculiar properties, the most striking of which is the persistency with which it adheres to the mucous surfaces and this probably accounts for its particular effectiveness as an astringent. Red gum is absolutely non-toxic but its germicidal action is remarkable. However, it is free from the bitter taste which characterizes many of the vegetable astringents.

Used in connection with a mouth wash or a dentifrice, it immediately acts to arrest bleeding of the gums and it can be conveniently used in these preparations because of the fact that it is entirely miscible with either water or alcohol in all proportions. This makes it especially valuable in the treatment of pyorrhea.

The method of preparing the tooth paste forming the principal subject of this invention is as follows:

A solution of 5 ounces of gum tragacanth in four gallons of water is preliminarily made up. Then 5 gallons of chemically pure glycerine U. S. P. are put into a mixer and 10 pints of the above mentioned solution added. 12 pounds of powdered soap, preferably castile, are then sifted into the solution, after which the mixer is operated for approximately fifteen minutes and then allowed to stand for five minutes when the following flavoring oils are added:

|  | Ounces. |
|---|---|
| Menthol crystals (Japanese) | 5 |
| Oil of wintergreen | 3 |
| Oil of aniseed | 9 |
| Oil of eucalyptus | 5 |
| Oil of peppermint (re-distilled) | 9 |

These flavoring oils are combined before being added to the ingredients in the mixer. Then 9¼ pounds finely powdered myrrh and 3¼ pounds finely powdered red gum are added and the mixer kept in operation until all the ingredients are thoroughly mixed. The myrrh and red gum act as astringents and are further antiseptic and styptic. After this, 5 pounds of pure powdered calcium carbonate is added in order to give body to the product and also for its polishing action on the teeth which, however, is not abrasive.

½ gallon of water in which one ounce of saccharine for sweetening purposes has been dissolved is then put into the mixer which is kept in operation, while the following amounts of calcium carbonate and water are added at intervals:

20 pounds of calcium carbonate, 4 pints of water.

20 pounds of calcium carbonate, 3 pints of water.

20 pounds of calcium carbonate.

After the above ingredients are thoroughly mixed, a solution consisting of 3 ounces of water in which there has been dissolved 2½ ounces zinc chloride is finally added after which the mixer is again operated for about thirty minutes. Zinc chloride acts as a caustic and also to prevent the growth of organisms which promote decay. The paste is then allowed to stand over night or for about twelve hours after which it will be ready for filling.

The mouth wash contains fluid extract of red gum together with distilled water and any other ingredients that may be desired. The gemicidal action of the red gum is equal to a fifteen per cent solution of carbolic acid and will act in this manner in the tooth paste, mouth wash, hemorrhoidal salves or in any other preparation.

These products are red in color which color results from the natural red gum, no artificial coloring agent being used. The red gum acts to destroy pus and being slightly acid, stimulates the salivary glands and increases the flow of ptyalin. It is superior to an alkaline dentifrice as such preparations merely render the mouth alkaline for a short time and their continued use may destroy the salivary glands and will impede their function.

By incorporating red gum into mouth washes, lozenges, fluids for injection, salves or the like, similar astringent, antiseptic and styptic results are obtained and the natural advantage of this vegetable astringent over similar products will at once be apparent.

I am aware that many changes in the proportions of the ingredients used and numerous steps in the operation of mixing the same may be varied throughout a wide range without departing from the spirit of the invention and, therefore, do not purpose limiting the patent granted hereon otherwise than as necessitated by the prior art.

I claim as my invention—

1. A dentifrice having as a principal ingredient thereof the gummy exudation of the *Eucalyptus rostrata* in a vehicle of dental paste.

2. A dentifrice containing fluid extract of *Eucalpytus rostrata* in a vehicle of dental cream comprising gum myrrh, zinc chloride, powdered castile soap and essential oils.

3. A dentifrice comprising in combination, extract of *Eucalyptus rostrata* in a vehicle of dental paste composed of gum tragacanth, glycerine, powdered soap, essential oils, powdered myrrh, calcium carbonate, saccharine, zinc chloride and water.

4. A dentifrice, comprising in combination, extract of *Eucalyptus rostrata* in a vehicle of dental cream including gum tragacanth, glycerine, powdered soap, menthol crystals, oil of wintergreen, oil of aniseed, oil of eucalyptus and oil of peppermint; with calcium carbonate and water.

5. A dentifrice comprising the following ingredients in approximately the proportions specified, gum tragacanth, 2 ounces; glycerine, 5 gallons; soap, 12 pounds; menthol crystals, 5 ounces; oil of wintergreen, 3 ounces; oil of aniseed, 9 ounces; oil of eucalyptus, 5 ounces; oil of peppermint, 9 ounces; powdered myrrh, 9¼ pounds; powdered red gum 3¼ pounds; saccharine, 1 ounce; zinc chloride, 2½ ounces; calcium carbonate, 65 pounds and water, 21 pints.

In testimony whereof I have hereunto subscribed my name in the presence of two subscribing witnesses.

HENRY N. CREGER.

Witnesses:
FRED. W. HIGBY,
MRS. B. P. STALDER.